United States Patent [19]

Arter

[11] Patent Number: 4,477,477

[45] Date of Patent: Oct. 16, 1984

[54] WINE PRESERVATION DEVICE AND METHOD

[76] Inventor: William L. Arter, 1214 Margarita, Fullerton, Calif. 92633

[21] Appl. No.: 364,779

[22] Filed: Apr. 2, 1982

[51] Int. Cl.³ .................. C12H 1/00; B65B 55/00; B65B 63/00

[52] U.S. Cl. .................. 426/330.4; 53/428; 99/275; 141/70; 215/307; 426/397; 426/592

[58] Field of Search .................. 426/330.4, 592, 486, 426/404, 15, 422, 397, 399, 393; 99/323.1, 323.2, 275; 141/1, 11, 14, 7, 70; 53/403, 428, 79, 432; 215/307, 11 R

[56] References Cited

U.S. PATENT DOCUMENTS

| | | | |
|---|---|---|---|
| 2,204,833 | 6/1940 | Stone | 53/428 |
| 2,862,528 | 12/1958 | Geisler | 141/70 |
| 3,212,537 | 10/1965 | Hinxlage et al. | 141/7 |
| 3,343,701 | 9/1967 | Mahoney | 215/307 |
| 3,406,079 | 10/1968 | Gibble | 426/393 |

FOREIGN PATENT DOCUMENTS 664992  5/1979  U.S.S.R. .................. 426/330.4

Primary Examiner—George Yeung
Attorney, Agent, or Firm—Mahoney & Schick

[57] ABSTRACT

A preservation device for wine remaining in containers from which a substantial portion of the contents has been dispensed. The preservation device includes a dispensing nozzle which is mountable in the container pouring opening and which is adjustable therein to juxtapose the dispensing end of the nozzle in contiguity to the surface of the remaining wine. Cooperative with the dispensing nozzle is a mount which maintains the dispensing nozzle in the pouring opening during the dispensing of a pressurized gas through the dispensing nozzle. The gas is maintained in a cylinder or capsule which is connected by connecting means to the nozzle and the mount for the nozzle includes fluid passage means permitting the bypassing of excess gas from the container during the dispensing of the gas from the dispensing end of the nozzle.

5 Claims, 4 Drawing Figures

WINE PRESERVATION DEVICE AND METHOD

BACKGROUND OF THE INVENTION

It is well known to oenologists and connoisseurs that the quality of wine remaining in a container after partially dispensing of the contents of the container has a tendency to rapidly deteriorate in quality. This process of deterioration is frequently referred to casually as oxidation but it appears to be a relatively complex phenomenon involving the rapid alteration of the various critical elements which contribute to the wine quality including, but not limited to, the taste of the wine, the bouquet and the various other constituent elements of the wine which constitute the melange of desirable qualities of the wine.

Attempts have been made to preserve the quality of the wine by capping, corking or otherwise closing the pouring opening of the container from which the wine has been previously dispensed. But such attempts are in vain since the air retained in the container above the remaining wine permits the deterioration process to continue.

The use of various types of gases in the food packing art is well known to those skilled in the art as exemplified by U.S. Pat. Nos. 586,632, 1,263,278, 2,204,833, 2,333,898, 2,705,578, 2,758,766, 3,212,537, 3,804,133, and 3,837,137.

However, these patents are directed to the pressurization of the open upper portion of a filled container and are not directed to the particular problem confronted by the device and method of the present application.

OBJECTS AND ADVANTAGES OF THE INVENTION

It is, therefore an object of the invention to provide a device which will permit the quality of the wine in a partially consumed container of wine to be maintained. Such maintenance of wine quality has become particularly critical in view of the rapid rise in the prices of wines of relatively modest pedigree and in view of the fact that numerous social events, such as wine tastings, entail the simultaneous opening of a large number of bottles or other containers of wine which, due to the nature of the event are not completely consumed.

Another object of the invention is the provision of a device for preserving the wine remaining in a partially dispensed container which is portable and which can be readily utilized to preserve the remaining wine by a relatively simple and expeditious operation.

A further object of the invention is the provision of a device of the aforementioned character which includes a gas dispensing nozzle having a dispensing extremity adapted to be inserted in the container through the pouring opening thereof and placed in contiguity to the surface of the remaining wine. The dispensing nozzle is adjustable on a mount provided therefor which locates it in the container opening and the nozzle is connected to the source of pressurized gas, preferably inert, such as nitrogen, argon or carbon dioxide.

In addition to being adjustable, the gas dispensing nozzle is adapted to be maintained in its adjusted position by means of a locating device on the mount and the mount itself is provided with fluid passages permitting the gas dispensed from the nozzle to flow out of the dispensing opening of the container so that the container is filled with the gas.

After the container has been filled with gas, it can be corked or otherwise closed.

Actual experiments have indicated that the utilization of the wine preserving device results in the maintenance of all of the desirable qualities of the wine to such an extent that the common rejection of residual wine because of what is commonly referred to as "oxidization" is eliminated.

Another object of the invention is a method for preserving residual wine in a container which includes the steps of introducing an inert gas into the container adjacent the surface of the remaining wine; permitting the excess gas to issue from the pouring opening of the container; and subsequently capping the container to retain the inert gas therein.

BRIEF DESCRIPTION OF THE DRAWINGS

Other objects and advantages of the invention will be apparent from the following specification and the accompanying drawings, which are for the purpose of illustration only, and in which.

DESCRIPTION OF A PREFERRED EMBODIMENT OF THE INVENTION

Figure 1:
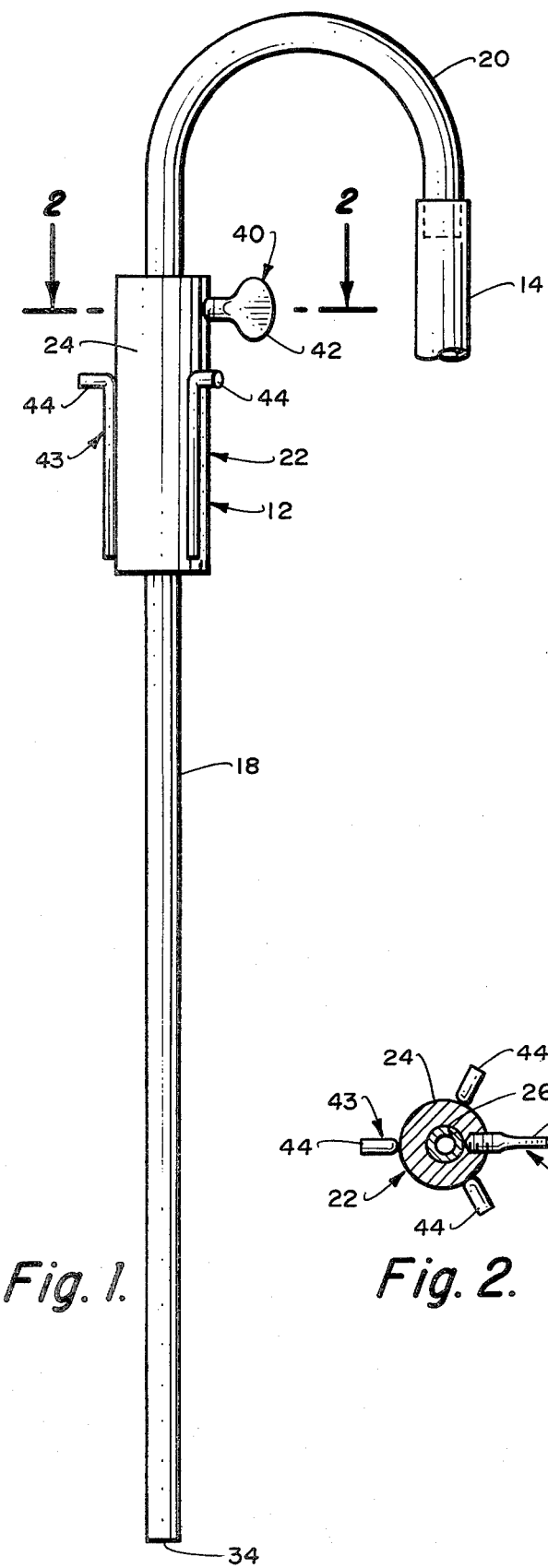
FIG. 1 is a side elevational view of the dispensing nozzle of my invention.
Figure 2:
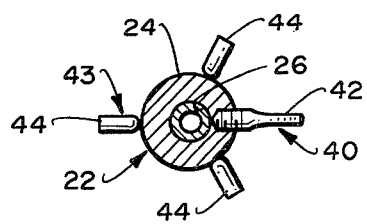
FIG. 2 is a transverse sectional view taken on the broken line 2—2 of FIG. 1.
Figure 3:
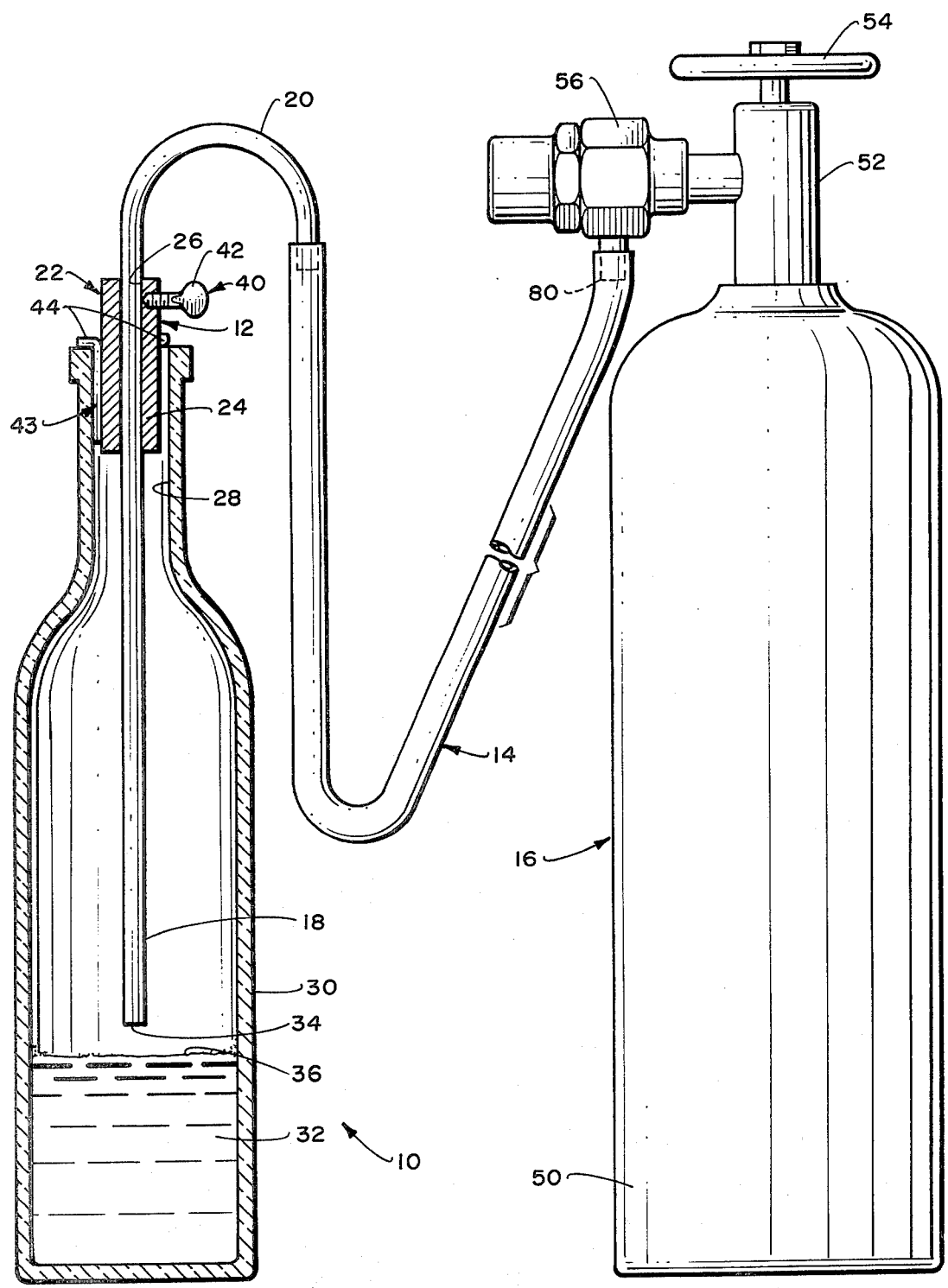
FIG.3 is an assembly view showing the dispensing nozzle operatively connected to the source of inert gas.

Referring to the drawings, and particularly to FIGS. 1-3 thereof, I show a wine preservation device 10 including a nozzle 12, a fluid connection 14, and a source of inert gas 16.

The nozzle 12 is constituted by an elongated tubular member 18 fabricated from stainless steel or any other suitable material such as aluminum, extruded synthetic plastic material or the like. Though not essential, the upper extremity of the nozzle is provided with a curvilinear portion 20 to facilitate its affixation to one extremity of the connecting means constituted by the tubing 14.

A mount 22 constitutes a part of the nozzle 12 and, in the present embodiment of the invention, is provided in the form of a cylinder 24 having a bore 26 and fabricated from stainless steel, aluminum, synthetic, plastic or the like. The diameter of the mount 22 is, as best shown in FIG. 3 of the drawings, somewhat less than the diameter of the pouring opening 28 of the container, such as the wine bottle 30 with which it is intended to be utilized to facilitate the insertion of the tubular dispensing portion 18 of the nozzle 12 within the empty portion of the bottle 30 which contains residual wine 32, FIG. 3.

The tubular dispensing portion 18 of the nozzle 12 is vertically adjustable in the bore 26 and, thus, the dispensing extremity 34 of the nozzle 12 can be raised or lowered within the confines of the bottle or other container 30 to juxtapose it to the upper surface 36 of the residual wine 32.

Facilitating the maintenance of the tubular portion 18 of the nozzle 12 in the adjusted position is a locating or positioning means 40 constituted, in one embodiment of the invention, by a thumbscrew 42.

Also constituting a part of the nozzle 12 are supporting means 43 constituted by inverted, L-shaped members 44 which can be fabricated from metallic wire or the like and which have the bases of the L-shaped members 44 impinging on the upper edge of the bottle 30 or other container adjacent the pouring opening 28 thereof to maintain the entire nozzle assembly 12 in operative relationship with the container.

While I have disclosed a particular construction of locating and positioning means 40 for the dispensing portion 18 of the nozzle 12, it will be obvious to those skilled in the art that alternative forms of locating devices may be utilized in substitution for the thumbscrew 42 whose inner extremity engages the perimeter of the tubular dispensing portion 18 of the nozzle 12 to maintain it in operative adjusted relationship within the mount 22.

For instance, the thumbscrew 42 can be eliminated and frictional means impinging on the perimeter of the tubular dispensing portion 18, such as spring fingers, or the like may be substituted therefor. It is only necessary that the locating or positioning means have sufficient physical contact with the perimeter of the tubular dispensing portion 18 of the nozzle to position the dispensing extremity 34 thereof in the desired proximity to the upper surface 36 of the residual body of wine 32.

Similarly, it is obvious that the supporting means 43 constituted by the L-shaped members 44 can be supplanted by various other expedients such as a disc or the like.

It will be noted that, as previously indicated, the external diameter of the cylindrical body 24 constituting the mount 22 is of smaller diameter than the internal diameter of the pouring opening 28 of the bottle 30. Consequently, the spaces between the members 43 constitute fluid passages permitting excess gas to pass upwardly and outwardly after the gas has been expelled into the interior of the bottle 30 from the lower, dispensing extremity 34 of the nozzle 12.

The cylinder 50 of pressurized gas, such as argon or the like, constitutes the source 16 of the gas and includes a control valve 52 at its upper extremity having a control knob or wheel 54 for permitting or preventing the flow of gas to a pressure regulator 56 which reduces the pressure of the gas as it issues therefrom into the connecting means constituted by the connecting tube 14.

When it is desired to utilize the wine preserving device 10, the tubular dispensing portion 18 of the nozzle 12 is located within the bottle 30 or other container until the mount 22 is positioned within the dispensing opening 28 by the supporting members 43.

The thumbscrew 40 or other locating means can be released, or otherwise adjusted, to permit vertical adjustment of the tubular dispensing portion 18 of the nozzle 12 and to locate the lower extremity 34 thereof adjacent the upper surface 36 of the remaining wine 32 in the bottle 30.

The control wheel 54 of the valve 52 can then be rotated to open the valve and cause the flow of inert gas through the connecting tube 14 and the nozzle 12 and out the lower extremity 34 of the tubular portion 18 of the nozzle 12.

Fifteen seconds of flow of the gas will be sufficient to isolate the wine 32 remaining in the bottle 30 and excess gas is permitted to flow through the fluid passages defined between the supporting members 43.

After the gas transmission is complete and the predetermined time has elapsed, the valve 52 is closed and the nozzle 12 readily removed from operative relationship with the bottle or other container.

The bottle is then recorked and can be placed in a bottle storage facility. I have discovered that the apparatus or device and method of the invention preserved the bouquet and other aspects of the residual wine remaining in the bottle or other container for relatively long periods of time in excess of weeks or months.

Figure 4:
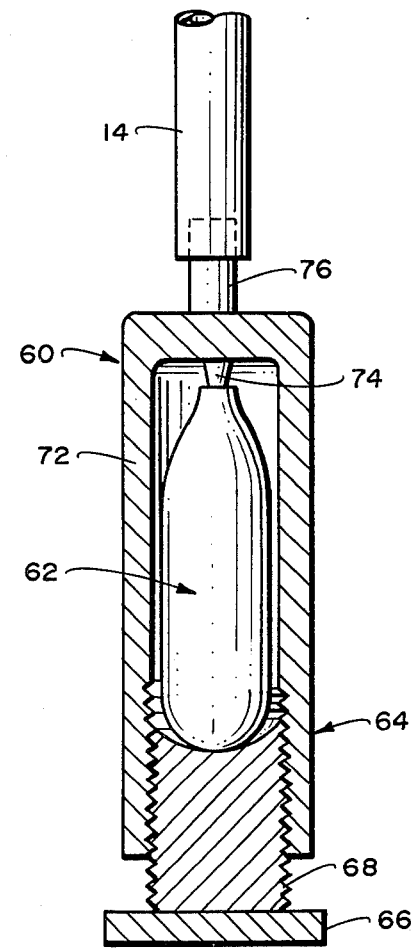
FIG. 4 is a vertical, partly sectional view of an alternative inert gas source.

Shown in FIG. 4 of the drawings is an alternative source 60 of gas under pressure, as, for instance, a $CO_2$ cartridge 62. The cartridge is located in a cartridge penetrating device 64 constituted by a base 66 having a threaded stud 68 extending upwardly therefrom which readily receives the lower extremity of a rotatable housing 72, said housing having a penetrating or punching prong 74 at the upper extremity thereof engageable with the upper extremity of the cartridge 62. The upper extremity of the housing 72 has a tubular fitting 76 which can be connected by the flexible tubular connection 14 to the nozzle 12. It will be noted that the regulator 56 is provided with a reduced exit passage 80 to restrict fluid flow from the cylinder 16 and to prevent undesired flow of gas from said cylinder.

Therefore, if the use of $CO_2$ or other alternate types of gas contained in relatively small cartridges is desired, the cartridge opening device 64 can be utilized instead of the larger gas source 16 constituted by the cylinder 50.

While I have described a preferred embodiment of my invention and various alternative forms of the details thereof, it will, of course, be obvious to those skilled in the art that various modifications may be made therein without the departing from the scope of the invention as defined in the appended claims.

I claim:

1. A wine preservation device for utilization in preserving the wine remaining in an open container having a pouring opening, comprising the combination of: means for defining a source of pressurized, inert gas; a valve connected to said source defining means; a connection to said valve; and an adjustable nozzle connected to said source through said connection, said nozzle having mounting means thereon for supporting same on said container, when said device is used with said container, for locating and supporting said nozzle below the pouring opening in said container, said mounting means comprising a plurality of supports projecting in spaced relationship about the perimeter of said mounting means, said supports being engaged with the portion of said container adjacent said pouring opening when in use, thereby providing spaces between the perimeter surface of said mounting means and the interior surface of said pouring opening to permit air in said container between the surface of said remaining wine and said mounting means to be expelled through said spaces when said inert gas is introduced through said nozzle into the container.

2. The device of claim 1 in which said nozzle is mounted for vertical movement in said mounting means, said nozzle having its lower extremity disposable by adjustment adjacent the surface of the wine remaining in said container.

3. The device of claim 2 in which said mounting means has positioning means associated therewith for maintaining the lower extremity of said nozzle in a predetermined location within said container.

4. The device of claim 3 in which said positioning means engages the perimeter of said nozzle to maintain it in the desired relationship with the surface of the wine remaining in said container.

5. A method of preserving the wine remaining in a previously opened container having a pouring opening, comprising the steps of: inserting a nozzle through said pouring opening and locating the end of said nozzle in juxtaposition to the surface of said remaining wine; supporting said nozzle in place with a mount supported on said container adjacent said pouring opening, said mount comprising a plurality of supports projecting in spaced relationship about the perimeter of said mount, said supports being engaged with the portion of said container adjacent said pouring opening, thereby providing spaces between the perimeter surface of said mount and the interior surface of said pouring opening to permit air to pass therebetween; dispensing a pressurized inert gas through said nozzle into said container and simultaneously venting the displaced air in said container through said pouring opening; continuing the flow of said inert gas until it issues from said pouring opening; terminating the flow of said inert gas; removing said nozzle from said container; and closing said pouring opening with said inert gas deposited in said container.

* * * * *